INVENTOR.
ALOIS WICHA
BY
ATTORNEYS.

May 7, 1935. A. WICHA 2,000,629

FLUID ACTUATOR

Filed Nov. 7, 1933 7 Sheets-Sheet 2

INVENTOR.
ALOIS WICHA
BY
ATTORNEYS.

May 7, 1935.  A. WICHA  2,000,629
FLUID ACTUATOR
Filed Nov. 7, 1933   7 Sheets-Sheet 3
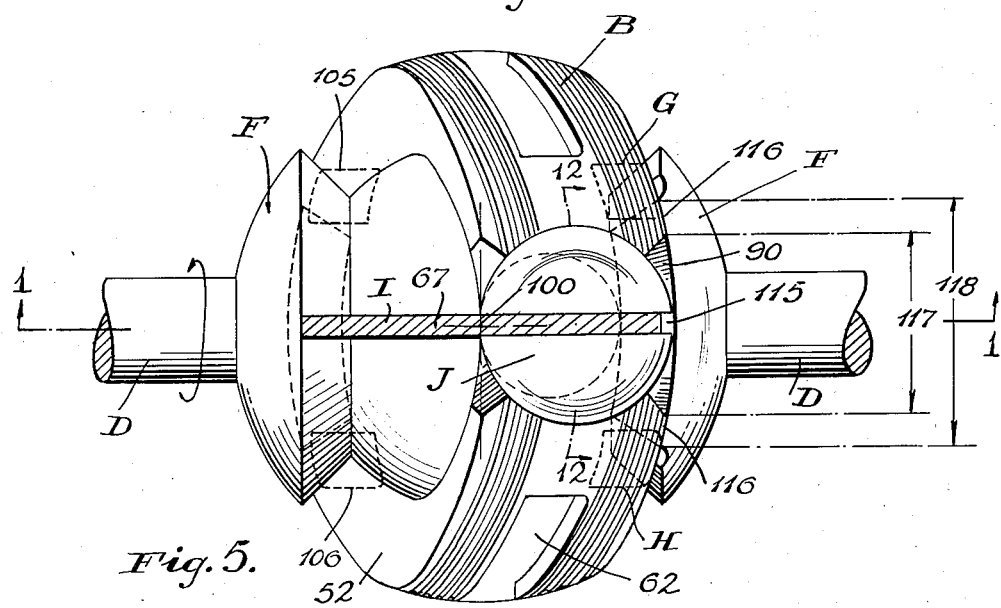
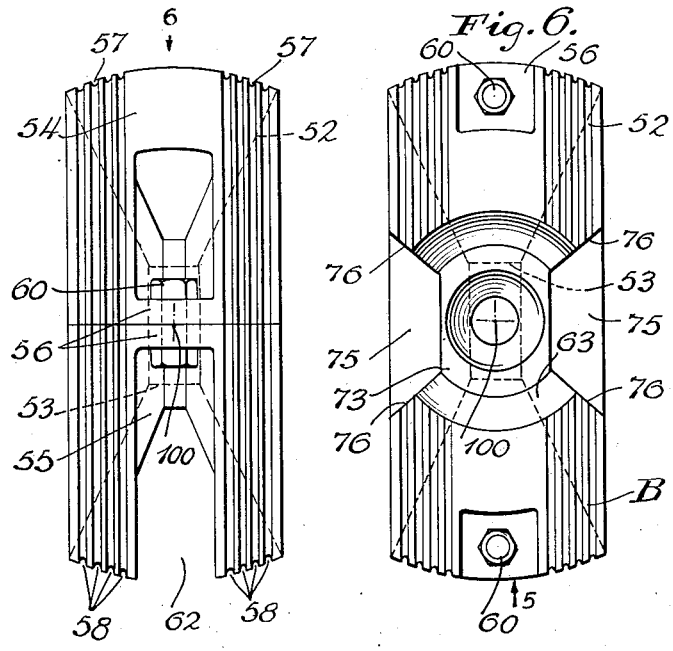
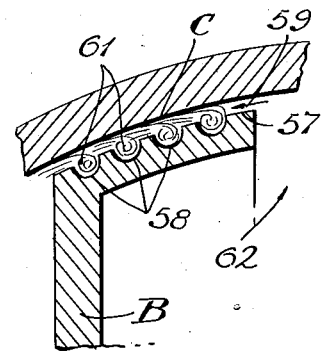
INVENTOR.
ALOIS WICHA
BY Richards & Geier
ATTORNEYS.

May 7, 1935.  A. WICHA  2,000,629
FLUID ACTUATOR
Filed Nov. 7, 1933  7 Sheets-Sheet 4
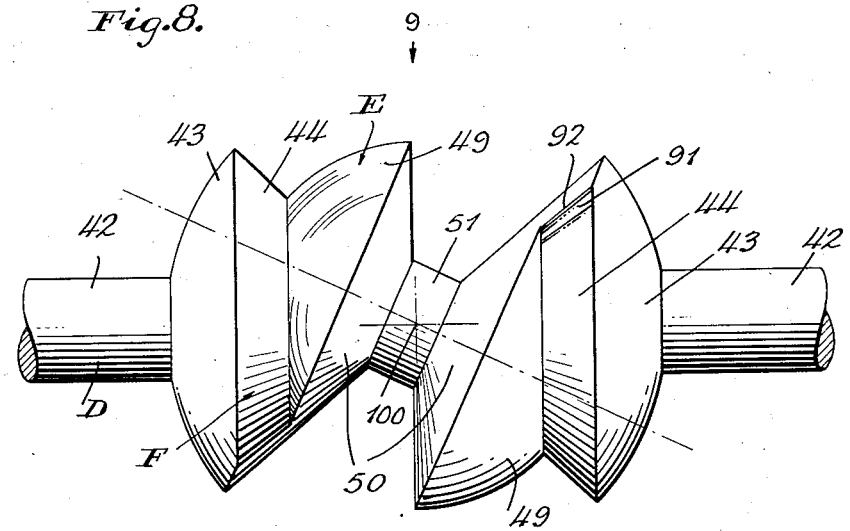
Fig. 8.
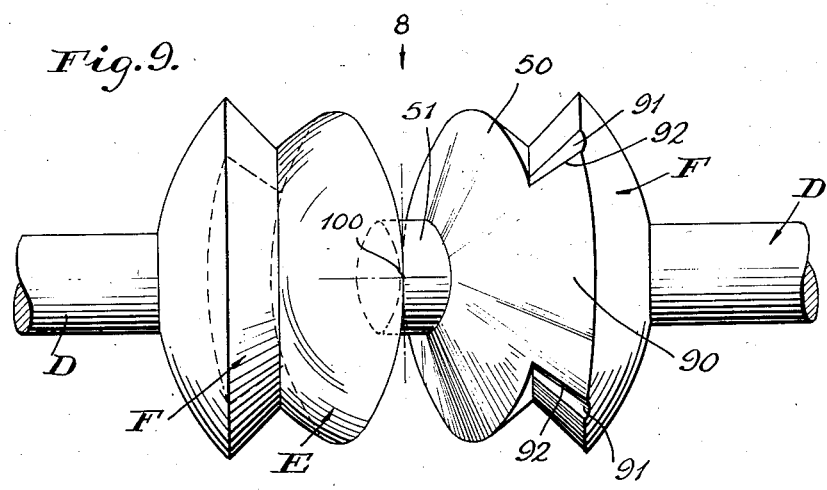
Fig. 9.
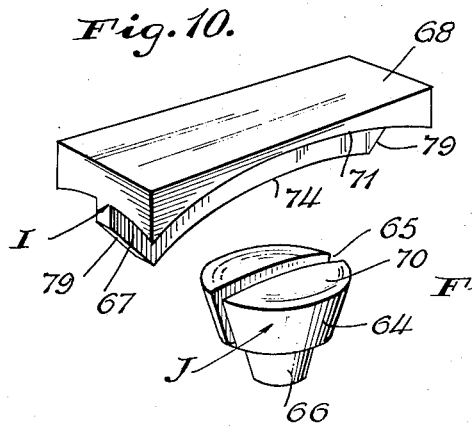
Fig. 10.
Fig. 11.
INVENTOR.
ALOIS WICHA
BY *Richards & Geier*
ATTORNEYS.

May 7, 1935.  A. WICHA  2,000,629
FLUID ACTUATOR
Filed Nov. 7, 1933  7 Sheets-Sheet 5

INVENTOR.
ALOIS WICHA
BY Richards & Geier
ATTORNEYS.

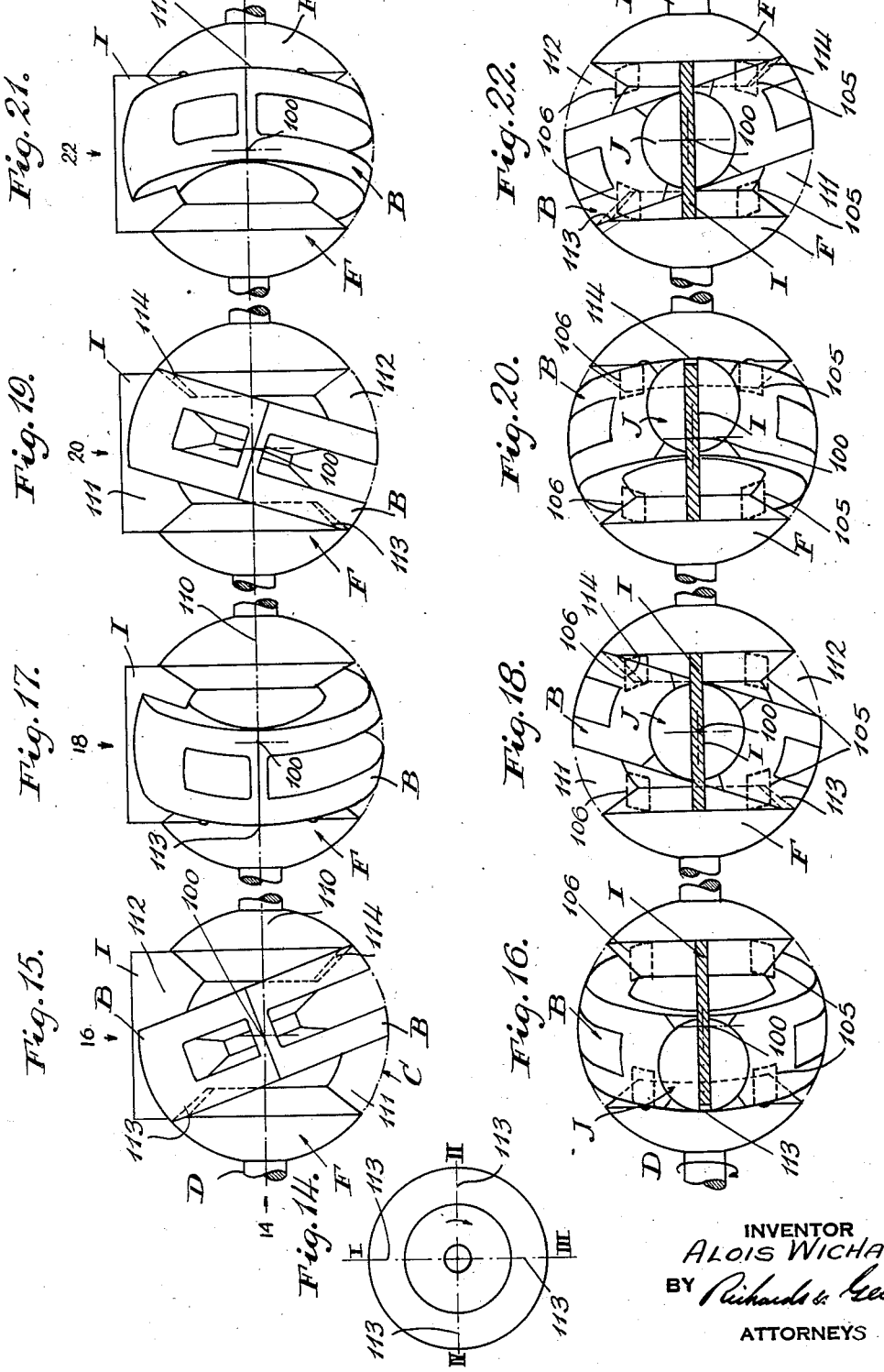

May 7, 1935.  A. WICHA  2,000,629
FLUID ACTUATOR
Filed Nov. 7, 1933  7 Sheets-Sheet 7

INVENTOR
ALOIS WICHA
BY
ATTORNEYS

Patented May 7, 1935

2,000,629

UNITED STATES PATENT OFFICE 2,000,629

FLUID ACTUATOR

Alois Wicha, Dresden, Germany, assignor to Erospha, Inc., Brooklyn, N. Y., a corporation of New York Application November 7, 1933, Serial No. 696,944

19 Claims. (Cl. 103—133)

The present invention relates to a fluid actuating device generally adapted for pumping liquids, creating a vacuum and/or compressing vapors and gases and so forth.

The present invention is particularly concerned with a novel type of fluid actuator consisting of a casing, the interior chamber of which may take the form of a spherical section or segment with a continuous peripheral spherical surface and flat or conical side walls; an oscillating piston impeller, the oscillating movement of which takes place both vertically and horizontally within the casing about a fixed center point; a drive shaft, which has an eccentric driving bearing for said impeller causes said impeller to undergo said movement within the casing whereby fluid is actuated or propelled from the inlet to the outlet, and combined or separated separating wall or partitioning and guide members mounted in said casing and received in slots, recesses or sockets in the side or sides of the impeller, separating the inlet from the outlet and preventing direct communication therebetween and also controlling the oscillating movement of the impeller so that it will partake of said relative pivotal and sliding movement without rotating with the shaft.

The impeller, the sides of which may be flat or outwardly converging and diverging at its periphery, is always in close adjuxtaposition to the peripheral spherical surface of the casing and is obliquely positioned within the interior chamber of the casing. As a result, the interior chamber will be symmetrically divided into two annular wedge-shaped compartments which will be separated from each other by the impeller.

The oscillating movement of the impeller will continuously rotate these compartments within the interior chamber of the casing from the inlet to the outlet and cause them to pass through the separating and/or guide member. As these compartments pass through this member they will be divided thereby, and will successively decrease in volume on the approach or outlet side of the guide member, compressing and/or expelling fluid through the outlet, and at the same time will increase in volume at the inlet side of the guide member, drawing in or sucking fluid through the inlet port of the casing.

It is an object of the present invention to so coordinate the impeller and the interior chamber of the casing that a most efficient seal and separation will be formed between the side of the impeller and the side wall of the interior chamber of the casing and also by the separating and/or guide member between the inlet suction division and the outlet pressure division of the wedge-like rotating compartments, without necessitating such critical dimensions and very close fits as would tend to cause jamming or cocking of the impeller and possible stoppage and injury to the apparatus during operation, particularly with liquid carrying suspended materials or solid particles or fibers which might lodge in the contact between the sides of the impeller and the side walls of the interior chamber of the casing.

Another object is to so coordinate the impeller and the casing that frictional contact between the periphery of the impeller and the surfaces of the interior chamber, between the side walls, will be largely avoided with resultant increase in efficiency so that at the same time the leakage from one side of the impeller to the other between separated compartments will be substantially decreased in magnitude.

In accomplishing these objects it has been found most satisfactory to form the side walls so that they will be provided with depressions to receive the propelling side of the impeller over a substantial area. The side walls are preferably in part shaped so as to receive a large part of the side face of the impeller.

In the preferred construction the side walls are caused to turn with the shaft so that said portion of the side of the impeller will move toward the same portion of the side wall throughout operation of the device.

Preferably, on the opposite sides of the depression in the side walls receiving the side face of the impeller are provided grooves having sharp edges which will tend to prevent solid particles or fibers carried or suspended in the liquid from entering into the area or space between the impeller and the side walls of the casing.

To eliminate friction between the periphery of the impeller and the corresponding contacting peripheral surface of the casing, it has been found satisfactory to space the periphery of the impeller substantially from the end walls and at the same time to provide a plurality of grooves extending around said periphery which will have the effect of creating eddy currents in any leakage flow, whereby a substantial resistance to flow across the periphery of the impeller will result.

The above and other objects will appear more clearly from the following detailed description, when taken in connection with the accompanying drawings, which illustrate an embodiment of the inventive idea.

In the drawings:

Figure 4 is a top view of the impeller, the partitioning member, the guide and the shaft, together with the side walls of the interior chamber, with the casing removed, taken upon the line 4—4 of Fig. 1.

Figures 5 and 6 are respectively side and top views of the impeller removed from the remainder of the structure of the fluid actuating device, Fig. 5 being taken in the direction indicated by the arrow 5 of Fig. 6 and Fig. 6 being taken in the direction indicated by the arrow 6 on Fig. 5.

Figure 7 is a diagrammatic fragmentary view upon an enlarged scale illustrating the juxtaposition of the edge of the impeller and the periphery of the casing.

Figures 8 and 9 are respectively side and top views of the shaft, together with the attached side walls, Fig. 8 being taken in the direction indicated by the arrow 8 on Fig. 9, and Fig. 9 being taken in the direction indicated by the arrow 9 in Fig. 8.

Figure 1:
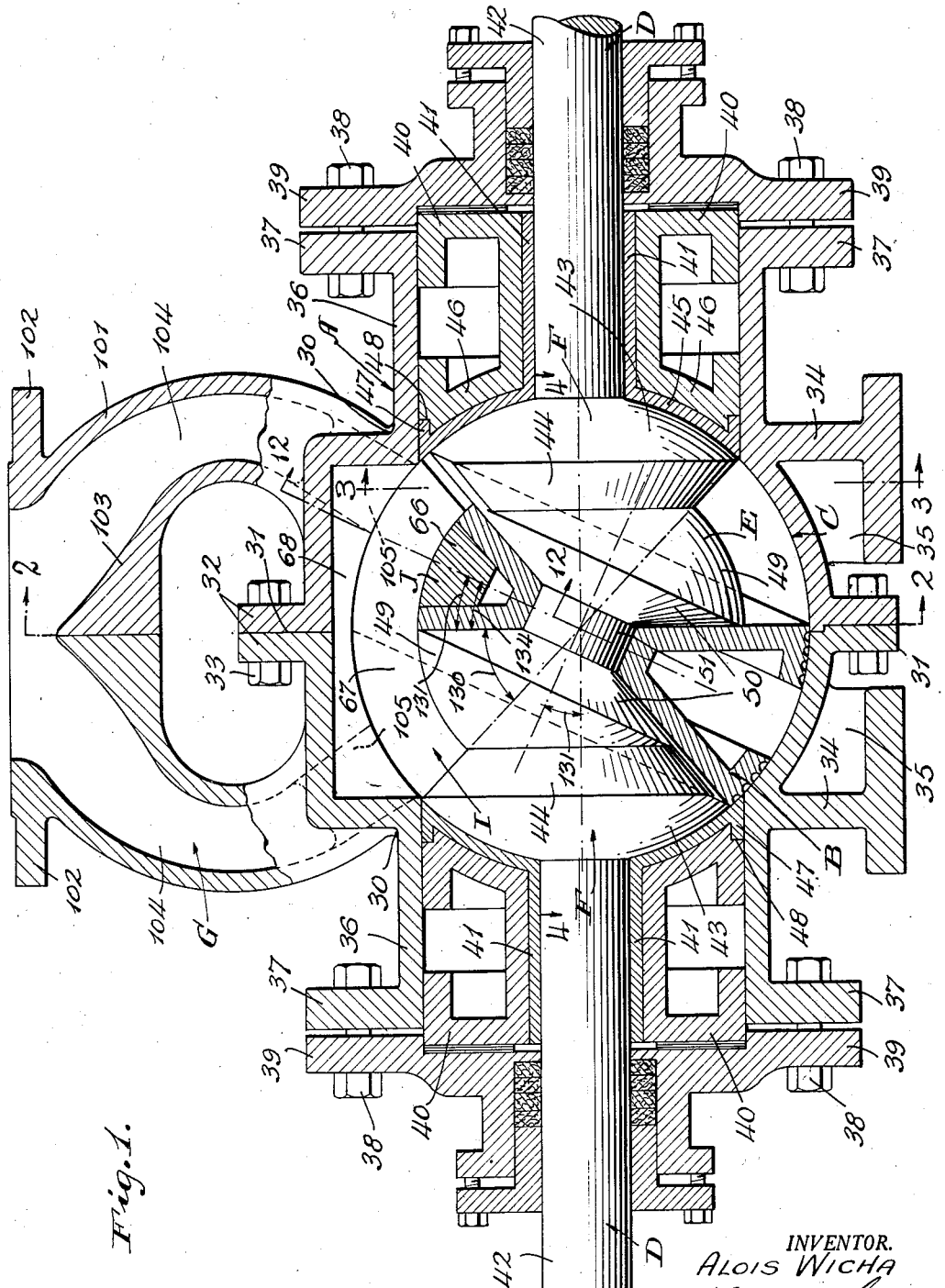
Figure 1 is a longitudinal sectional view of one form of a fluid actuating device upon the line 1—1 of Figs. 2 and 3.
Figure 12:
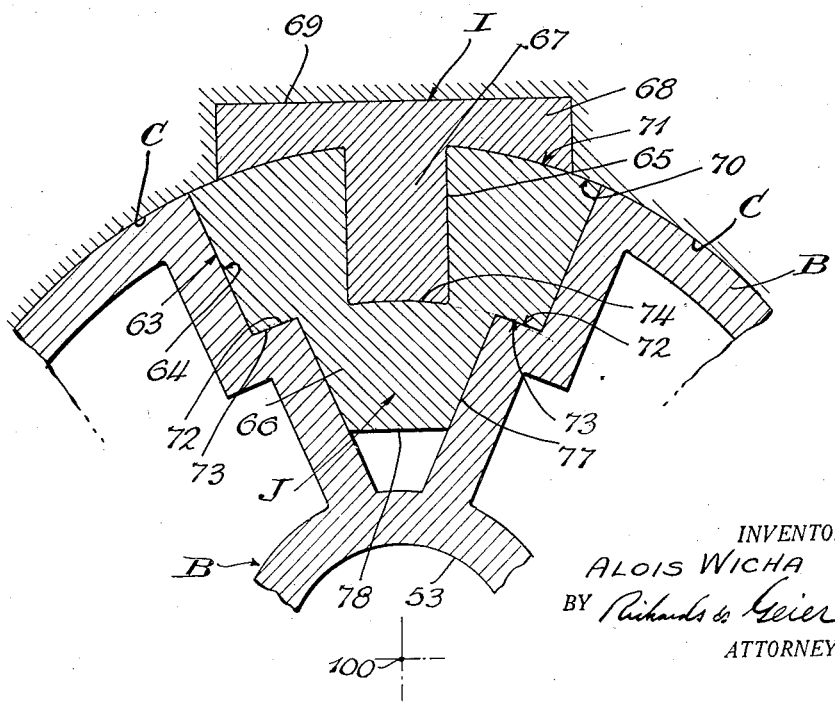

Figures 10, 11 and 12 show the guide and partitioning elements, Figs. 10 and 11 being on a relatively small scale and being perspective views respectively of the separating element and of the guide element, and Fig. 12 being on a relatively enlarged scale and being a cross sectional view taken upon the line 12—12 of Figs. 1 and 4.

Figure 13:
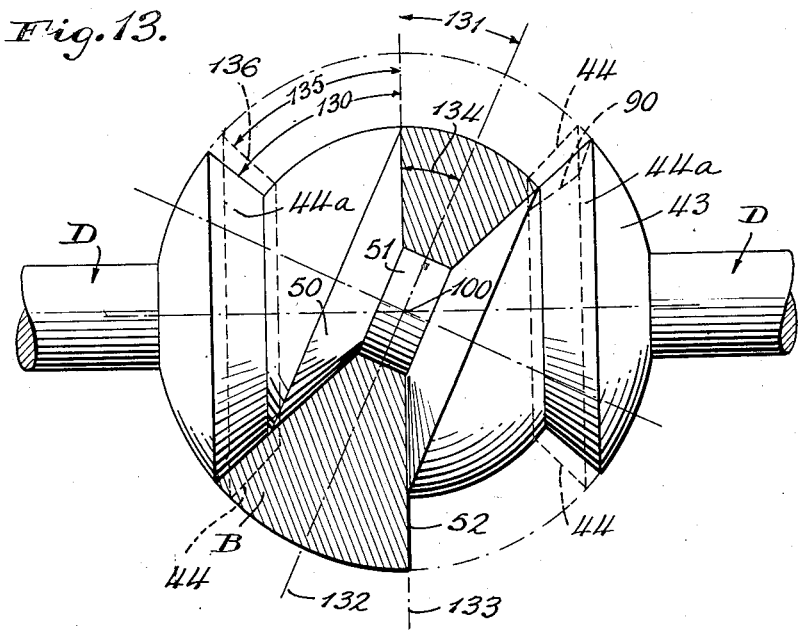

Figure 13 is a diagrammatic view illustrating the angles and the design of the impeller structure.

Figures 14 to 22 are diagrammatic views illustrating the operation of fluid actuating devices of Figures 1 to 13, Fig. 14 being a diagrammatic chart of operations, Figs. 15, 17, 19 and 21 being side views of the impeller, together with the side walls and guide and separating members, with the casing removed, on a small scale illustrating four different operation positions of the impeller; and Figs. 16, 18, 20 and 22 being top views similar to the showing of Fig. 4 on a small scale, also showing four different positions of the impeller corresponding respectively to Figures 15, 17, 19 and 21.

Figure 23:
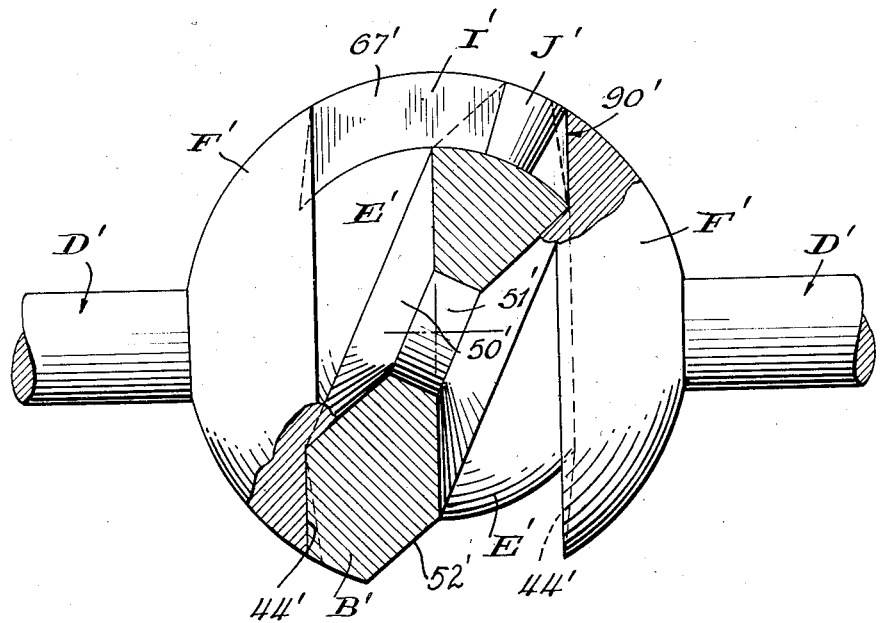
Figure 24:
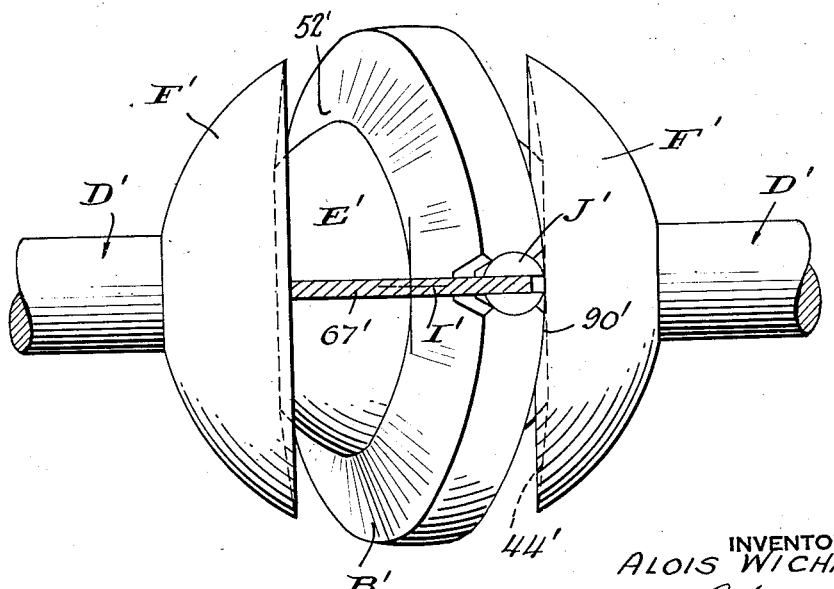

Figures 23 and 24 are views of another embodiment respectively similar to Figs. 1 and 4, Fig. 23 being a side sectional view, and Fig. 24 being a top view, both with the casing removed.

The fluid actuating device as shown in Figs. 1 to 4 is provided with a casing A, an oscillating rolling impeller B enclosed in the interior chamber C, which impeller is actuated by means of the shaft D. The shaft D carries the slotted ball element E and also the side wall members F. The inlet port G is prevented from communicating with the outlet port H directly through the casing by the partitioning member or wall I with which is associated the conical guide J.

Figure 2:
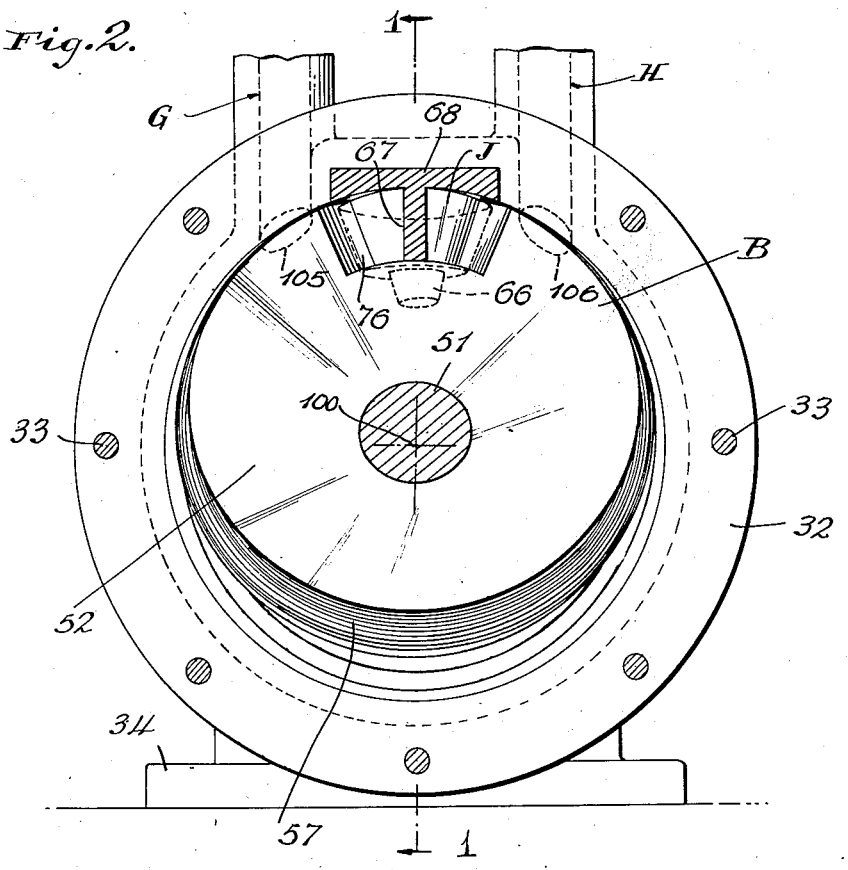
Figure 2 is a transverse sectional view of the device taken upon the line 2—2 of Fig. 1.

The casing A as shown in Figures 1 and 2 is provided with the two half sections 30 which at their contacting surfaces 31 are provided with the flanges 32 enabling bolting together as indicated at 33. Connected to the lower part of the casing halves 30 are the feet 34 connected by the web 35, which feet may be bolted to a suitable support. The sides of the casing halves 30 are preferably provided with the tubular extensions 36, which at their ends are provided with the flanges 37, adapted to be connected by the bolts 38 through the cooperating flanges 39 of the packing casing. Inserted in the tubular extension 36 of the casing halves 30 are the bearing elements 40 which receive the bushing sleeves 41. The bushing sleeves 41 receive the shaft sections 42 to which are connected the spherical side wall members F having the annular spherical shaped bearing surfaces 43 and inwardly converging conical surfaces 44 (see Figs. 8 and 9 also). The spherical surface 43 of the side wall element F bears in the annular spherical cup 45 constituting an extension of the bearing sleeve 41 which is supported in a correspondingly shaped annular cup member 46 forming a part of the insert 40. The flange extension 47 on the end of the cup 45 extends into the shoulder 43 in the insert member 40.

Between the side wall elements F, see Figs. 1 to 4, 8 and 9, is connected the slotted ball E having the spherical outside surface 49, the converging wall surfaces 50 of the slot and the cylindrical central oblique bearing surface 51 centrally connecting the converging conical surfaces 50.

The impeller B is carried in the slot 50—51 of the ball element E (see Figs. 1, 2 and 4). It is provided with the outwardly diverging propelling surfaces 52, the inner portions of which contact with the diverging sides 50 of the slot of the ball E and with the interior cylindrical surface 53 which rides upon the correspondingly shaped surface 51 of the slot 50—51.

The impeller as shown is hollow and is of two-piece construction, the halves 54 and 55 being joined together by the flanges 56 and the bolts 60. From the periphery of the side walls 52 extend inwardly the annular spherical flanges 57 which are peripherally grooved as indicated at 58, (see particularly Figs. 6 and 7). As shown best in Fig. 7, it will be noted that the peripheral flange 57 is spaced substantially as indicated at 59 from the wall of the interior chamber C. This spacing as disclosed in my copending application 656,637 filed Feb. 13, 1933, may be of the order of 0.1 mm. in width but may also be varied from 0.05 to 0.5, depending upon the size and structure of the pump. It should be sufficient that frictional contact between the flange 57 and the periphery of the chamber C will not result but at the same time it will not be so large as to permit excessive leakage across the spacing of the peripheral grooves 58. The peripheral grooves set up eddy currents, as diagrammatically indicated at 61, which will prevent any substantial flow or leakage across the periphery of the impeller B in the space 59, this effect being further assisted by the opening 62, between the two impeller flanges 57.

As shown best in Fig. 6, the impeller is provided with the conical socket 63 to receive the guide J, see particularly Fig. 11, the conical outer surface of the guide 64 contacting closely with the interior surface 63 of the cavity in the end of the impeller.

The guide J is provided with a central slot 65 and with an extension 66, see also Fig. 12. The slot 65 receives the fin 67, see particularly Figs. 2, 4 and 12, which is connected to the plate 68, said plate 68 fitting into a recess 69 in the top of the casing A, as shown in Figs. 1, 2 and 12.

The connection between the plate 68 and the recess 69, is of such a character as to hold the fin firmly in position and rigidly in respect to the casing A.

The top surface of the guide cone 70 is of spherical shape so as to closely contact with the peripheral surface of the chamber C, and the plate 68 is provided with a spherical depression 71 in continuation of the interior side walls of the chamber C to afford a bearing surface for the upper surface 70 of the guide J. The walls of the slot 65 are flat to contact with the correspondingly shaped walls of the fin 67 and to slide therealong with sidewise oscillation of the impeller B. The conical surface 64 of the guide J pivots and rotates relatively to the conical surface 63 in the impeller. The step 72 between the main cone 64 and the cone extension 66 of the guide is also of concave spherical shape to cooperate with the correspondingly shaped surface 73 at the bottom of the socket 63. The bottom of the fin 67 is also of spherical shape as indicated at 74 to contact with the spherical surfaces 75 constituting a continuation of the spherical shelf 73. It will be noted that the socket is provided with the bevelled opening 76 at its side to allow for a relative rotation of the impeller B in respect to the fin 67. The extension 66 is received in the conical socket 77 formed in the structure of the impeller B above the annular central portion 53 thereof. It will be noted that the extension 66 terminates at 78 short of the central annular ring 53 of said impeller. The sides 79 of the fin 67 as best shown in Fig. 10, are cut off at an inclination converging toward the center point 100 of the casing so as to conform to the converging surfaces 44 at the inner sides of the side wall elements F, as shown in Figs. 1 to 4.

As shown in Figs. 1, 2, 3, 4, 8 and 9, a portion of the conical surfaces 44 of the side wall elements F is cut away, as indicated at 90, to conform to the outer surface 52 of the side wall of the impeller so that the impeller will be received in said cut-out portion 90, with the result that there will be a conformation between the side of the impeller B and the side walls F over a substantially large area. At the termination of the portion 90 are provided the grooves 91 which are provided with the sharp edge 92 which tend to move over the side faces 52 of the impeller B and prevent the lodgment of any solid particles coming from the liquid between the side walls and the impeller structure.

The inlet connections are shown in Fig. 1 and they consist of a casting 101 provided with the flanges 102 to enable said casting to be suitably connected with an inlet conduit, which casting is provided with a central partition 103 forming the separate inlet passage 104 having inlet ports 105, (see Fig. 1) on one side of the separating fin 67, (see also Fig. 2). On the other side of the separating fin 67 is a similar arrangement for carrying the outlet connections and the outlet ports, the liquid or fluid being drawn into the apparatus on one side of the separating wall 67 and being expelled on the other side of the separating wall.

The operation of the pump is most conveniently shown from the diagrammatic views 14 to 22. Fig. 14 diagramatically illustrates the turning of the impeller B and Figs. 15 to 22 showing side and front views of the impeller B in each of the positions I, II, III and IV of Fig. 14. Fig. 14 may be regarded as taken in the direction of the arrow 14 shown in Fig. 15 with the lines I, II, III and IV of Fig. 14 representing the center of the conformation area of the side of the impeller B with the side walls F.

Referring to Figs. 15 to 22, when the shaft D rotates the impeller B will be caused to sweep backwardly both horizontally and vertically in the interior chamber C with the result that the impeller will partake of an oscillation.

At the same time, the axes about which the impeller B tends to swing will also tend to rotate about the fixed common center point 100 of the device. The horizontal axis of the impeller will describe two cones about the axis 110 of the shaft D, the apices of which cone meet at the point 100. At the same time the vertical axis will swing in a vertical plane along the center line of the separating element I.

As indicated best in Figs. 16, 18, 20 and 22, the obliquely located impeller B will divide the interior chamber C into two annular wedge-shaped compartments 111 and 112, which are symmetrically disposed with respect to the center point 100 of the pump, the compartments 111 being to the left of the impeller B while the compartments 112 are to the right of the impeller B.

During the oscillating movement of the impeller B these compartments 111 and 112 rotate within the interior of the casing C of the pump.

During rotation, these compartments 111 and 112 are successively opened and closed to the inlet ports 105 and the outlet ports 106, so that fluid or liquid which is received through the inlet ports 105 will be carried to the outlet ports 106. These compartments will transfer liquid or fluid through the lower part of the casing from the inlet to the outlet with transfer being prevented through the upper part of the casing by the separating or partitioning device I. It will be noted in Figs. 16, 18, 20 and 22, that as the impeller moves from the position of Fig. 16 to that of Figs. 18, 20, and 22 the compartments 111 and 112 move through the partitioning wall I and are divided thereby, so that they sucessively decrease in volume in communication with the outlet port 106 and increase in volume in the inlet ports 105. In Figs. 15 and 16 the compartment 112 is substantially bisected by the partitioning wall I, while in Figs. 17 and 18 both compartments 111 and 112 are divided by said partitioning wall I. In Figs. 19 and 20 the compartment 111 is bisected by the partitioning wall I, while in Figures 21 and 22 both compartments 111 and 112 are divided by said partitioning wall.

The inlet and outlet division of each compartment 111 and 112 in addition to being separated by the chamber member I are also separated by the conformation space between the impeller B and the side wall F. This conformation on the left side of Figs. 15 to 22 is indicated by the numerals I, II, III and IV respectively for Figs. 15 and 16, Figs. 17 and 18, Figs. 19 and 20 and Figs. 21 and 22. In Figs. 15 to 22 the conformation area is indicated by the numeral 113 for the compartment 111 and by the numeral 114 for the compartment 112. It will be noted that the opposite conformation areas 113 and 114 are diametrically opposed.

By depressing the side wall to receive a large portion of the area of the impeller, the conformation areas 113 and 114 takes place over a considerable area and assures a satisfactory seal between the inlet and outlet divisions of the compartments 111 and 112.

Referring to Figs. 4, 16 and 20 it will be noted due to the cutting away portion 90 of the side walls F that there is an open space 115 between said cut-out surface 90 and the end of the partitioning wall and the cut off end 79 of the part 67 of the device I. This, however, will be sealed, as best shown in Fig. 4 by the conformation of portions of sides of the impeller with portions of the cut out portion 90, as indicated at 116 in Fig. 4. This seal across the interstices 115 at the end of the partitioning wall 67 will be satisfactory as long as the dimension 117 between the outside of the diverging portions 76 of the impeller B will be less than the dimension 118 which is the width of the cut out portion 90 which conforms with the side of the impeller B.

Referring to Fig. 13 the angle 130 between the side face 52 of the impeller and the basic conical side surface 44a of the side wall F should be at least twice the angle of oscillation 131. The half angle 134 between the side face 52 of the impeller B and the vertical plane 132 through the impeller may be equal to the half angle of oscillation 131 as shown in Fig. 13, or may be greater or less than said half angle of oscillation. It is preferred, however, that the half angle 134 of the impeller B should be equal to more than the half angle 131 of oscillation. To obtain a surface conformation of the side face 52 of the impeller B with the depressed portion 90 of the interior side surface 44 of the side wall elements F, the half angle 131 should be larger than half of the angle 135 between the side face 52 of the impeller and the line 136. The length of the conformation of the side walls 52 of the impeller B with the cut out portion 90 of the surface 44 of the side wall element F becomes greater as the angle 135 becomes smaller.

In Figs. 23 and 24 similarly functioning parts to Figs. 1 to 22 are referred to by the same letters and numerals primed.

In Figs. 23 and 24 it will be noted that the impeller B' is provided with outwardly converging side walls 52' which serve to impel or propel the fluid or liquid into the interior chamber C'. On the other hand the interior side faces 44' of the side wall members F' are inwardly divergent instead of inwardly convergent. The cut out portion 90' in the faces 44' of the side walls F' are of slightly different contour to accommodate the conical face 52' of the impeller B'.

The present application is similar in subject matter to my copending applications Serial No. 636,295, filed October 5, 1932; Serial Nos. 656,637—8—9, 656,640—1—2—3, filed February 13, 1933, and Serial Nos. 673,244—5, filed May 23, 1933, and it is particularly directed to that embodiment of the spherical engine and/or fluid actuating mechanisms disclosed in said copending applications in which the oscillating impeller or piston and the side walls of the chamber in which it is received are caused to conform at their adjacent portions over a considerable area to form a surface or space packing or seal to largely prevent passage of fluid between said conforming surfaces.

Figure 3:
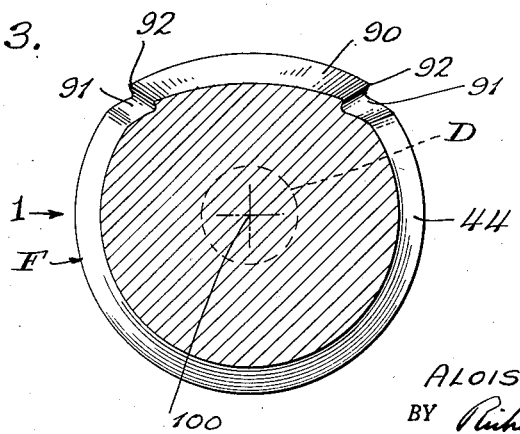
Figure 3 is a fragmentary side sectional view on the line 3—3 of Fig. 1, illustrating the construction of the side wall without the other elements being shown.

By the expression "parallel spaced surface conformations" or "spacial conformations" utilized in the accompanying claims is meant the conformation of the periphery of the impeller in respect to the interior periphery of the interior pumping chamber, and also the conformation of the side of the impeller with the depression or recess in the side walls at the positions indicated at 90 in Figs. 3 and 9. In the preferred form, as shown upon the drawings, there is a fixed parallel spacing between the conforming encircling surface of the chamber, the tubular surfaces being in juxtaposition to each other but at all times being spaced from each other, and devoid of contact with each other. The spaced surface conformations differ from supporting contacts such as are encountered in bearing clearances in which the outer bearing member is of a substantially greater diameter than the inner diameter bearing member, with the result that the space will be formed between the inner and outer bearing element, causing loading at one side of contact along a line and an unloaded bearing at the other which gradually increases to the maximum loaded bearing surface.

What is claimed is:

1. In a fluid pumping device, a casing having interior relatively rotating side walls and a spherical side peripheral wall connecting said side walls, an impeller piston disc, the periphery of which is in close adjuxtaposition to and substantially spaced from the spherical side peripheral wall and oscillates vertically and horizontally with an oscillating movement between said side walls and about the center point of said casing, a shaft passing into said casing to rotate said side walls having an eccentric cam member actuating said impeller disc and a pivotally connected guide fitting in a slot in said disc preventing rotation of said disc, the axes of said shaft and said pivotally connected guide intersecting at said center point, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, the sides of said impeller being smooth and continuous and devoid of projections and embossments and said side walls of said casing being provided with recesses to receive the sides of said disc, the sides of said disc having spaced surface conformations with said recesses in said side walls on opposite sides of the center point of the casing.

2. In a fluid actuating device, a casing with relatively rotating side walls and with a spherical peripheral wall and having inlet and outlet ports, an oscillating impeller piston disc, an eccentric driving shaft therefor to rotate said side walls and a pivoted guide for preventing rotation of the impeller, said shaft upon rotation causing a lateral and longitudinal oscillation of said impeller disc, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, the sides of said impeller being smooth and continuous and devoid of projections and embossments and said side walls of said casing being provided with recesses to receive the sides of said disc, the sides of said disc having spaced surface conformations with said recesses in said side walls on opposite sides of the center point of the casing.

3. In combination, a casing having an interior taking the form of a spherical section with relatively rotating side walls and with a spherical peripheral wall between said side walls, and provided with an inlet port and an outlet port, an oscillating impeller therein, a shaft to rotate said side walls having an eccentric bearing for said impeller passing into said casing and a pivotally mounted guide connected to said impeller to prevent said impeller from turning, said impeller forming a plurality of symmetrical separated compartments in said casing and upon actuation by said shaft serving successively to open and close said compartments to said inlet and then to the outlet whereby fluid will be moved through said casing from said inlet to said outlet, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, the sides of said impeller being smooth and continuous and devoid of projections and embossments and said side walls of said casing being provided with recesses to receive the sides of said disc, the sides of said disc having spaced surface conformations with said recesses in said side walls on opposite sides of the center point of the casing.

4. In a fluid actuating device, a casing with relatively rotating side walls and with a spherical peripheral wall and having inlet and outlet ports, an oscillating impeller disc having outwardly converging conical side surfaces and a peripheral spherical surface, an eccentric driving shaft therefor to rotate said side walls and a pivoted guide for preventing rotation of the impeller, said shaft upon rotation causing a lateral and longitudinal rolling oscillation of said impeller disc, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, the sides of said impeller being smooth and continuous and devoid of projections and embossments and said side walls of said casing being provided with recesses to receive the sides of said disc, the sides of said disc having spaced surface conformations with said recesses in said side walls on opposite sides of the center point of the casing.

5. In combination, a casing having an interior taking the form of a spherical section, said section being provided with a spherical peripheral wall and with rotating side walls, and provided with an inlet port and an outlet port, an oscillating impeller disc therein not partaking of said rotational movement of said side walls, a shaft to rotate said side walls having an eccentric bearing for said impeller passing into said casing, and a pivotally mounted guide connected to said impeller to prevent said impeller from turning, said impeller forming a plurality of reversely congruent separated chambers in said casing and upon actuation by said shaft serving successively to open and close said chambers to said inlet and then to the outlet whereby fluid will be moved through said casing from said inlet to said outlet, the sides of said disc having spaced surface conformations with the side walls of said interior on opposite sides of the center point, the sides of said disc being smooth and continuous and devoid of projections and embossments, and said side walls of said interior being provided with recesses to receive the sides of said disc, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing.

6. In a fluid actuating apparatus, a casing with relatively rotating side walls and with a spherical peripheral wall and an impeller disc therein, a rotary shaft to rotate said side walls having an oblique bearing portion upon which said disc is mounted, means to drive said shaft to cause said disc to undergo an oscillating movement above a fixed center point, and a guide engaging said disc to hold the same against rotation while said shaft is being driven, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, the sides of said impeller being smooth and continuous and devoid of projections and embossments and said side walls of said casing being provided with recesses to receive the sides of said disc, the sides of said disc having spaced surface conformations with said recesses in said side walls on opposite sides of the center point of the casing.

7. In a pumping device, a casing having relatively rotating spaced side walls and a spherical peripheral wall, a liquid actuator member including a disc-like impeller having converging side walls and having a peripheral spherical wall, which peripheral spherical wall is in close adjuxtaposition to the peripheral wall of said casing but spaced therefrom sufficiently to avoid frictional and supporting contact, said adjuxtaposition surfaces being maintained in parallelism but substantially separated from each other throughout operation, means to control the motion of said impeller so as to cause it to move toward the same place on the side walls of the casing and to move laterally between said side walls across the peripheral wall of the casing, said peripheral wall of the casing being provided with inlet and outlet ports and said impeller controlling said inlet and outlet ports by its oscillation between the side walls, pumping compartments being formed between said side walls of said casing and the exterior sides of said impeller, which pumping chambers are peripherally limited by said spherical peripheral wall of said casing, the exterior sides of said impeller forming the sides of said pumping compartments being smooth and continuous and devoid of projections and embossments and said side walls of said casing being provided with recesses at said portion toward which the impeller moves to receive the sides of said impeller.

8. In a pumping device, a casing having relatively rotating spaced side walls and a spherical peripheral wall, a liquid actuator member including a disc-like impeller having a peripheral spherical wall, which peripheral spherical wall is in close adjuxtaposition to the continuous peripheral wall of said casing but substantially spaced therefrom to avoid frictional and supporting contact, said adjuxtaposition surfaces being maintained in parallelism but substantially separated from each other throughout operation, means to control the motion of said impeller so as to cause it to move laterally between said side walls across the peripheral wall of the casing, said peripheral wall of the casing being provided with adjacent inlet and outlet ports and said impeller controlling said inlet and outlet ports by its oscillation between the side walls, said means to control the motion of said impeller including double slotted connections, one between the impeller and a central driving element and the other between the impeller and a converging guide, the sides of said impeller being smooth and continuous and devoid of projections and embossments and said side walls of said interior being provided with recesses to receive the sides of said impeller.

9. In a pumping arrangement, a casing having spaced rotating side walls, a spherical peripheral wall connecting the side walls and inlet and outlet ports intersecting said peripheral wall, a non-rotating liquid actuating member comprising a disc-like impeller with a peripheral spherical terminal surface, which terminal surface is in close adjuxtaposition to but substantially spaced from the peripheral wall of the casing, said peripheral wall and said terminal surface being maintained in parallelism to each other and substantially spaced from each other throughout operation to form a very narrow parallel wall slot preventing frictional and supporting contact, means to cause said impeller to have spaced surface conformations with opposite portions of the side walls and so that it will oscillate laterally between the side walls across said peripheral wall thereby controlling said inlet and outlet ports, said impeller being provided with continuous side surfaces devoid of protuberances and embossments and said conformations being formed by recesses in said side walls.

10. In a pump, a casing having spaced rotating side walls and a spherical peripheral wall connecting said side walls, said casing being provided with inlet and outlet ports adjacent to each other and intersecting said peripheral wall, a non-rotating liquid actuating member consisting of a disc-like impeller with a peripheral spherical terminal surface positioned in close juxtaposition to but substantially spaced from the peripheral wall of said casing, said peripheral wall and said terminal surface being maintained in parallelism to each other and substantially spaced from each other throughout operation to form a very narrow parallel wall slot preventing frictional and supporting contact, a reaction member provided with a slotted connection in said impeller and serving to separate said inlet and outlet ports, and means to cause said impeller to have a spacial conformation with the side walls of said casing along diametrically opposite areas and to cause said impeller to oscillate laterally between said side walls whereby its peripheral terminal surface will control the inlet and outlet ports, said impeller being provided with continuous side surfaces devoid of protuberances and embossments and said conformations being formed by recesses in said side walls.

11. In combination, a casing having an interior taking the form of a spherical section, said section being provided with a spherical peripheral wall and with rotating side walls, and provided with an inlet port and an outlet port, an oscillating non-rotating impeller disc therein, a shaft to rotate said side walls and having an eccentric bearing for said impeller passing into said casing, and a pivotally mounted guide connected to said impeller to prevent said impeller from turning, said impeller forming a plurality of reversely congruent separate chambers in said casing and upon actuation by said shaft serving successively to open and close said chambers to said inlet and then to the outlet whereby fluid will be moved through said casing from said inlet to said outlet, the sides of said disc by a continuous side surface devoid of protuberances and embossments having conformations with the side walls of said interior on opposite sides of the center point, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, said side walls being relatively movable in respect to the casing, said conformations with said side walls of the impeller being formed by recesses in said side walls and said impeller in its movement always approaching said recesses in said side walls, said separated chambers being formed between the continuous side surfaces of said impeller disc and said side walls, the outside of the chamber being determined by the portion of the spherical peripheral wall of said interior exposed between said rotating side walls and the sides of said disc.

12. In combination, a casing having an interior taking the form of a spherical section, said section being provided with a spherical peripheral wall and with rotating side walls, and provided with an inlet port and an outlet port, an oscillating non-rotating impeller disc therein, a shaft to rotate said side walls and having an eccentric bearing for said impeller passing into said casing, and a pivotally mounted guide connected to said impeller to prevent said impeller from turning, said impeller forming a plurality of reversely congruent separated chambers in said casing and upon actuation by said shaft serving successively to open and close said chambers to said inlet and then to the outlet whereby fluid will be moved through said casing from said inlet to said outlet, the sides of said disc by a continuous side surface devoid of protuberances and embossments having conformations with the side walls of said interior on opposite sides of the center point, the periphery of said impeller being located in close adjuxtaposition to said spherical peripheral wall but being spaced therefrom sufficiently to avoid frictional and supporting contact, said adjuxtaposition surfaces being maintained in parallelism but substantially separated from each other throughout operation, the inlet and outlet ports intersecting said spherical peripheral wall and being controlled by the lateral oscillation of the edge of the impeller between the side walls of the casing, said side walls being connected to the shaft to rotate therewith, said conformations with said side walls of the impeller being formed by recesses in said side walls and said impeller in its movement always approaching said recesses in said side walls, said separated chambers being formed between the continuous side surfaces of said impeller disc and said side walls, the outside of the chamber being determined by the portion of the spherical peripheral wall of said interior exposed between said rotating side walls and the sides of said disc.

13. In combination, in a spherical machine, a casing having a non-rotating interior chamber to receive and discharge fluids and an oscillating non-rotating disk-like impelling piston therein, said interior chamber being provided with rotating side walls and said piston being positioned obliquely within said chamber, said side walls being provided with extended surfaces conforming to substantial areas on the sides of the piston, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

14. In combination, in a spherical machine, a casing having a non-rotating interior chamber to receive and discharge fluids and an oscillating non-rotating disk-like impelling piston therein, said interior chamber being provided with rotating side walls and said piston being positioned obliquely within said chamber, said side walls being provided with extended surfaces conforming to substantial areas on the sides of the piston, said side walls having conical contours and said extended surfaces being formed by removing portions of the conical contours, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

15. In combination, in a spherical machine, a casing having a non-rotating interior chamber to receive and discharge fluids and an oscillating non-rotating disk-like impelling piston therein, said interior chamber being provided with rotating side walls and said piston being positioned obliquely within said chamber, said side walls being provided with diametrically opposed extended surfaces which conform to the side faces of the piston, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

16. In combination, in a spherical machine, a casing having a non-rotating interior chamber to receive and discharge fluids and an oscillating non-rotating disk-like impelling piston therein, said interior chamber being provided with rotating side walls and said piston being positioned obliquely within said chamber, said side walls and the side surfaces of said piston being formed in part so that said side surfaces and side walls will conform with each other over an extended area, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

17. In combination, in a spherical machine, a casing having a non-rotating interior chamber to receive and discharge fluids and an oscillating non-rotating disk-like impelling piston therein, said interior chamber being provided with rotating side walls, said piston being positioned in said chamber so as to extend obliquely from one side wall to a diametrically opposite portion of the other side wall, the adjacent faces of the piston and the side walls conforming to each other over an extended area, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

18. In combination, in a spherical machine, a casing having a non-rotating interior chamber to receive and discharge fluids and an oscillating non-rotating disk-like impelling piston therein, said interior chamber being provided with rotating side walls and said piston being positioned obliquely within said chamber, said side walls being provided with extended surfaces conforming to substantial areas on the sides of the piston, said side walls being constituted of frusto-conical surfaces, and said piston oscillating between said side walls without rotating in respect to said casing, the sides of said piston being devoid of embossments and protuberances and moving during operation toward the same portion of said side walls, which portion of said side walls is provided with a recess to conform to the side faces of said piston, the surface of said recess being parallel to the side face of said piston, and fluid conveying compartments within said machine being formed between said rotating side walls and said sides of said piston and said compartments converging towards said recess.

19. In a mechanism of the type having a casing with a peripheral spherical wall and with rotating side walls, said peripheral wall and said side walls being relatively movable, an oscillating non-rotating impeller member enclosed within said walls, said impeller member extending obliquely between said walls from a portion of one side wall to a diametrically opposite portion of the other side wall, the adjacent portions of the side walls and of the impeller being formed to conform to each other over an extended area so as to form an efficient seal preventing the flow of fluid thereby, said side walls being recessed at diametrically opposite points to conform to said impeller, and the sides of said impeller adjacent said side walls contacting with the fluid being actuated and being devoid of protuberances and embossments.

ALOIS WICHA.